US010545916B2

(12) United States Patent
Baek

(10) Patent No.: US 10,545,916 B2
(45) Date of Patent: Jan. 28, 2020

(54) FILE MANAGEMENT METHOD FOR SELECTING FILES TO PROCESS A FILE MANAGEMENT INSTRUCTION SIMULTANEOUSLY

(71) Applicant: NHN Entertainment Corporation, Seongnam-si (KR)

(72) Inventor: Chang-Yol Baek, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 596 days.

(21) Appl. No.: 14/836,312

(22) Filed: Aug. 26, 2015

(65) Prior Publication Data

US 2016/0063023 A1 Mar. 3, 2016

(30) Foreign Application Priority Data

Aug. 29, 2014 (KR) .......................... 10-2014-0114497

(51) Int. Cl.
*G06F 17/30* (2006.01)
*G06F 16/16* (2019.01)
*G06F 3/0482* (2013.01)
*H04L 29/08* (2006.01)

(52) U.S. Cl.
CPC .......... *G06F 16/168* (2019.01); *G06F 3/0482* (2013.01); *H04L 67/1097* (2013.01)

(58) Field of Classification Search
CPC ...................................................... G06F 3/048
USPC ........... 707/805; 715/810; 345/168; 245/168
See application file for complete search history.

(56) References Cited

U.S. PATENT DOCUMENTS 8,319,733 B1 * 11/2012 Lu ........................... G06F 3/048
345/156
9,047,003 B2 * 6/2015 Lee ...................... G06F 3/04883
2009/0140997 A1 6/2009 Jeong et al.
(Continued)

FOREIGN PATENT DOCUMENTS

JP 2004-038308 2/2004
JP 2011-505641 2/2011
(Continued)

OTHER PUBLICATIONS

Japanese Office Action dated Mar. 5, 2019, issued in Japanese Patent Application No. 2015-168253.

*Primary Examiner* — Baoquoc N To
(74) *Attorney, Agent, or Firm* — H.C. Park & Associates, PLC

(57) ABSTRACT

A method performed by a digital device including a touch interface display apparatus to simultaneously process files displayed thereon includes determining an execution instruction from a first input by a processor, the first input including a user's touch movement in a first direction on a first file, executing the execution instruction for at least two files including the first file from a second input by the processor, the second input including the user's touch movement in a second direction intersecting the first direction, transmitting the execution instruction over a communication network to one or more remote servers associated with the at least two files, and executing the received execution instruction, by each of the remote servers, for corresponding ones of the at least two files stored on a database of the remote server, in which the files displayed on the digital device are arranged in the second direction.

22 Claims, 18 Drawing Sheets

(56) References Cited

U.S. PATENT DOCUMENTS

| | | | | |
|---|---|---|---|---|
| 2010/0013780 A1* | 1/2010 | Ikeda | ............... | G06F 3/04883 |
| | | | | 345/173 |
| 2010/0137031 A1* | 6/2010 | Griffin | ............... | G06F 3/0482 |
| | | | | 455/566 |
| 2012/0096400 A1 | 4/2012 | Cho | | |
| 2012/0278759 A1* | 11/2012 | Curl | ............... | G16H 40/20 |
| | | | | 715/804 |
| 2013/0194311 A1* | 8/2013 | Tashima | ............... | G09G 5/38 |
| | | | | 345/660 |
| 2013/0234963 A1* | 9/2013 | Yu | ............... | G06F 3/0412 |
| | | | | 345/173 |
| 2013/0246970 A1* | 9/2013 | Helle | ............... | G06F 3/0482 |
| | | | | 715/822 |
| 2013/0254714 A1* | 9/2013 | Shin | ............... | G06F 3/0482 |
| | | | | 715/810 |
| 2014/0028585 A1 | 1/2014 | Park et al. | | |
| 2014/0191986 A1 | 7/2014 | Kim et al. | | |
| 2015/0026641 A1 | 1/2015 | Wu et al. | | |

FOREIGN PATENT DOCUMENTS

| | | |
|---|---|---|
| JP | 2012-089115 | 5/2012 |
| JP | 2015-513149 | 4/2015 |
| JP | 2015-535125 | 12/2015 |
| KR | 10-2011-0100003 | 9/2011 |
| KR | 10-2014-0016107 | 2/2014 |
| KR | 10-2014-0089245 | 7/2014 |
| KR | 10-2014-0138227 | 12/2014 |
| WO | 2013/131473 | 9/2013 |
| WO | 2014/081870 | 5/2014 |

\* cited by examiner

FILE MANAGEMENT METHOD FOR SELECTING FILES TO PROCESS A FILE MANAGEMENT INSTRUCTION SIMULTANEOUSLY

CROSS REFERENCE TO RELATED APPLICATION

This application claims priority from and the benefit of Korean Patent Application No. 10-2014-0114497, filed on Aug. 29, 2014, which is hereby incorporated by reference for all purposes as if fully set forth herein.

BACKGROUND

Field

Exemplary embodiments relate to a file management method performed by a digital device including a touch interface display apparatus. More particularly, exemplary embodiments relate to a file management method for selecting files to process a file management instruction simultaneously.

Discussion of the Background

Digital devices, such as a smartphone, tablet PC, and personal digital assistant (PDA), may include a touch panel display, so that a user may conveniently use and control the digital device by touching a graphic user interface displayed on the touch panel display. Since the digital devices may communicate with other digital devices or servers through wireless communication networks, users of the digital device may exchange files stored in the digital device or message each other almost anywhere. For example, a user of a digital device (smartphone or tablet PC) may access a mail server or a Social Network Service (SNS) server to send a message to other user or receive messages from other users.

The digital device may provide various file management functions, including message management functions. Such file management functions may include deleting file(s), copying file(s), cutting file(s), sending file(s), and moving file(s). Similar functions may be provided for message management functions. For example, a user may wish to delete some messages stored in the mail server and SNS server using a graphic user interface provided in the digital device. However, the user may have to select messages to be deleted in a one-by-one way, and then select a menu for deleting messages. Such methods may be inconvenient for the users in current communication circumstance, where so many messages and files are exchanged between users.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a file management method for processing files simultaneously.

Additional aspects will be set forth in the detailed description which follows, and, in part, will be apparent from the disclosure, or may be learned by practice of the inventive concept.

An exemplary embodiment discloses a method performed by a digital device including a touch interface display apparatus to simultaneously process files displayed thereon, including determining an execution instruction from a first input, by a processor of the digital device, the first input including a user's touch movement in a first direction on a first file of the files, executing the execution instruction for at least two files of the files and including the first file from a second input, by the processor of the digital device, the second input including the user's touch movement in a second direction intersecting the first direction, transmitting the execution instruction over a communication network to one or more remote servers associated with the at least two files, and executing the received execution instruction, by each remote server, for the corresponding ones of the at least two files stored on a database of the remote server, in which the files displayed on the digital device are arranged in the second direction.

An exemplary embodiment also discloses a method performed by a digital device including a touch interface display apparatus to simultaneously process files displayed thereon, including selecting a first file from the files displayed along a first direction with respect to the digital device according to a first input, the files being arranged in a second direction intersecting the first direction, selecting at least one second file from the files according to a second input, the second input comprising a user's touch movement in the second direction from the first file, and selecting and executing an execution instruction for the first file and the selected at least one second file.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
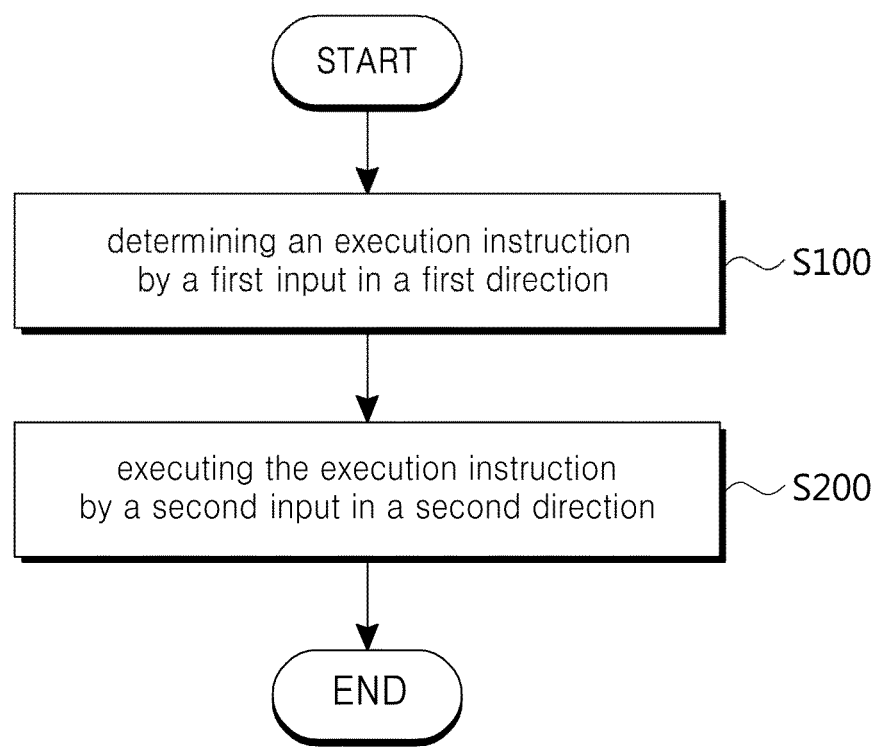
FIG. 1 is a flow chart illustrating a file management method according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A file management method according to an exemplary embodiment may be performed by a digital device including a touch interface display apparatus. The digital device may include a smartphone, tablet PC, PDA, etc.

The file management method may be associated with executing a file management instruction for files or messages at once. Information related to each of the files or messages, such as title of the message, a part of message, or file information, may be displayed in a first direction. The displayed files may be arranged in a second direction intersecting the first direction.

The file management method may be used for at least one message files of an email account, message files of an online messenger account, and message files of a social network service (SNS) account. The file management method may be used for document files, multimedia files, or other various types of files in the same manner.

Hereinafter, the file management method according to exemplary embodiments will be described in detail.

Figure 2:
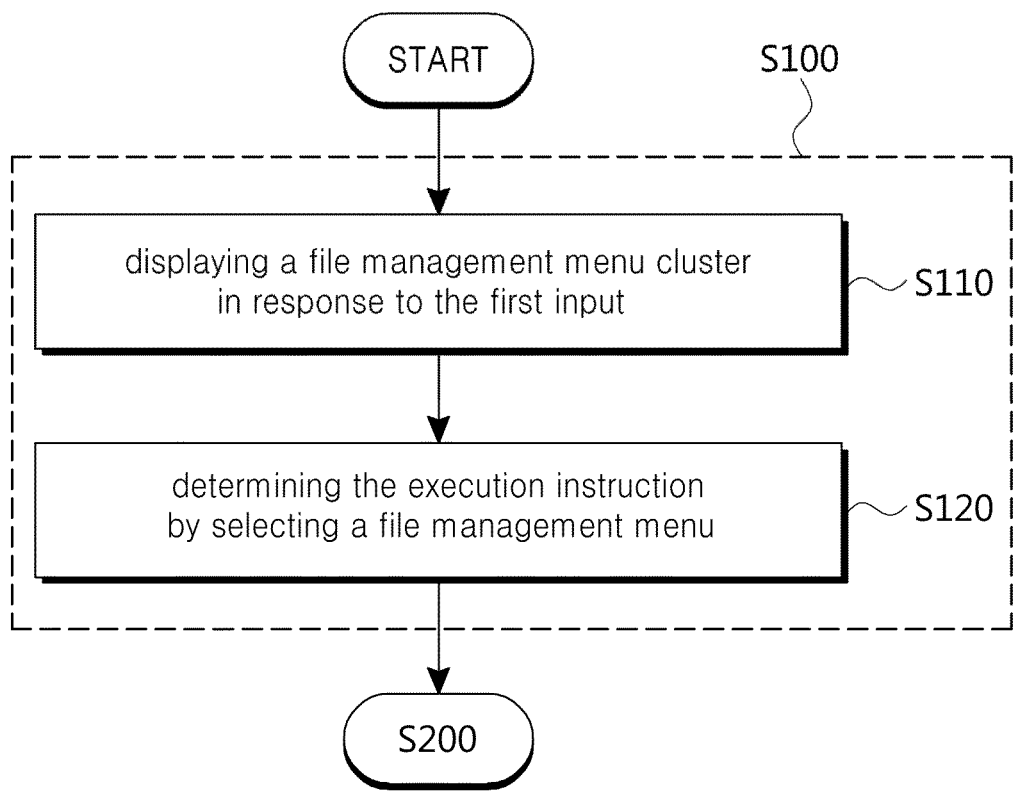
FIG. 2 is a flow chart illustrating a detailed process of S100 of FIG. 1.
Figure 3:
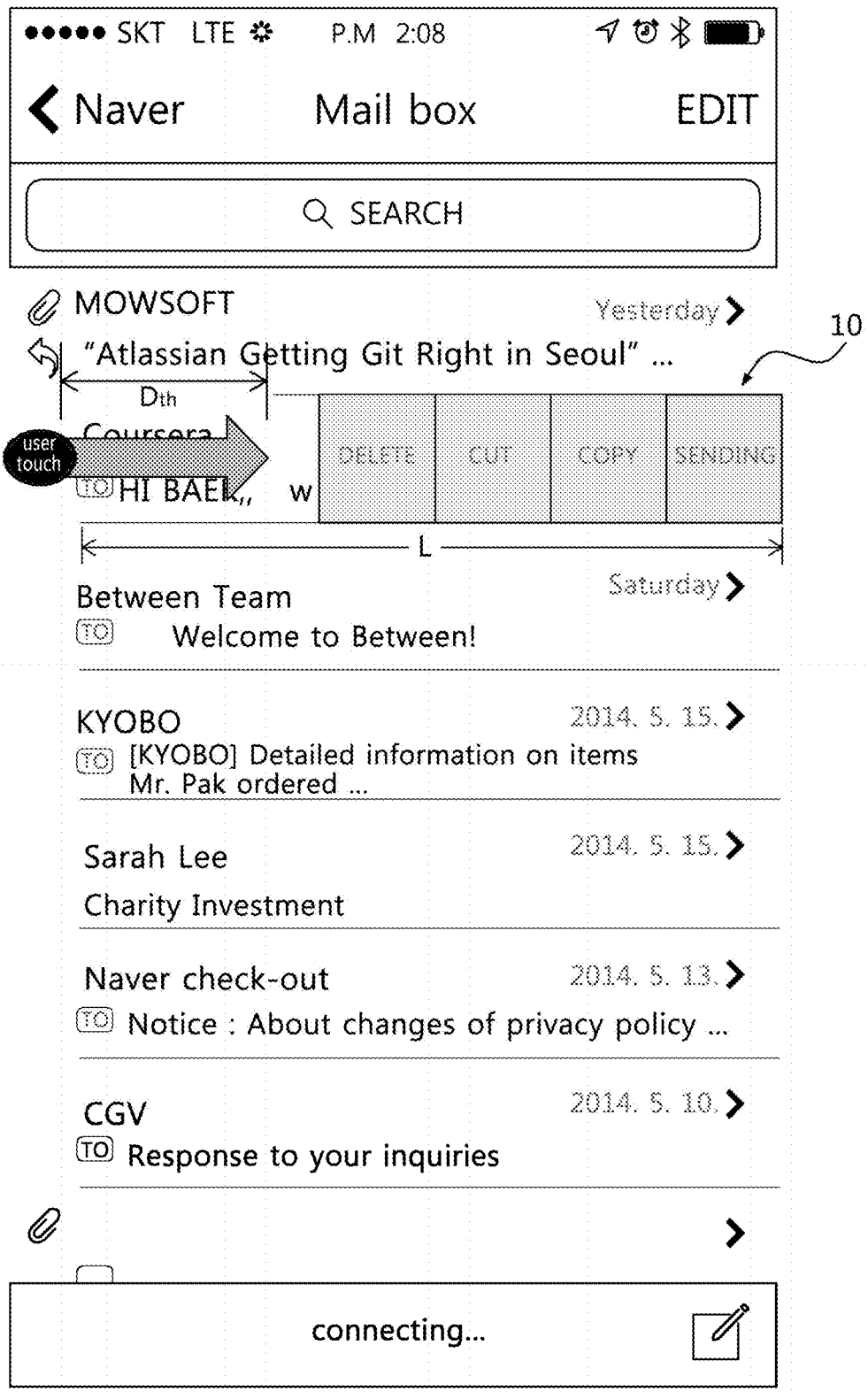
FIG. 3 is a screenshot of display when a file management menu cluster is displayed according to an exemplary embodiment.
Figure 4:
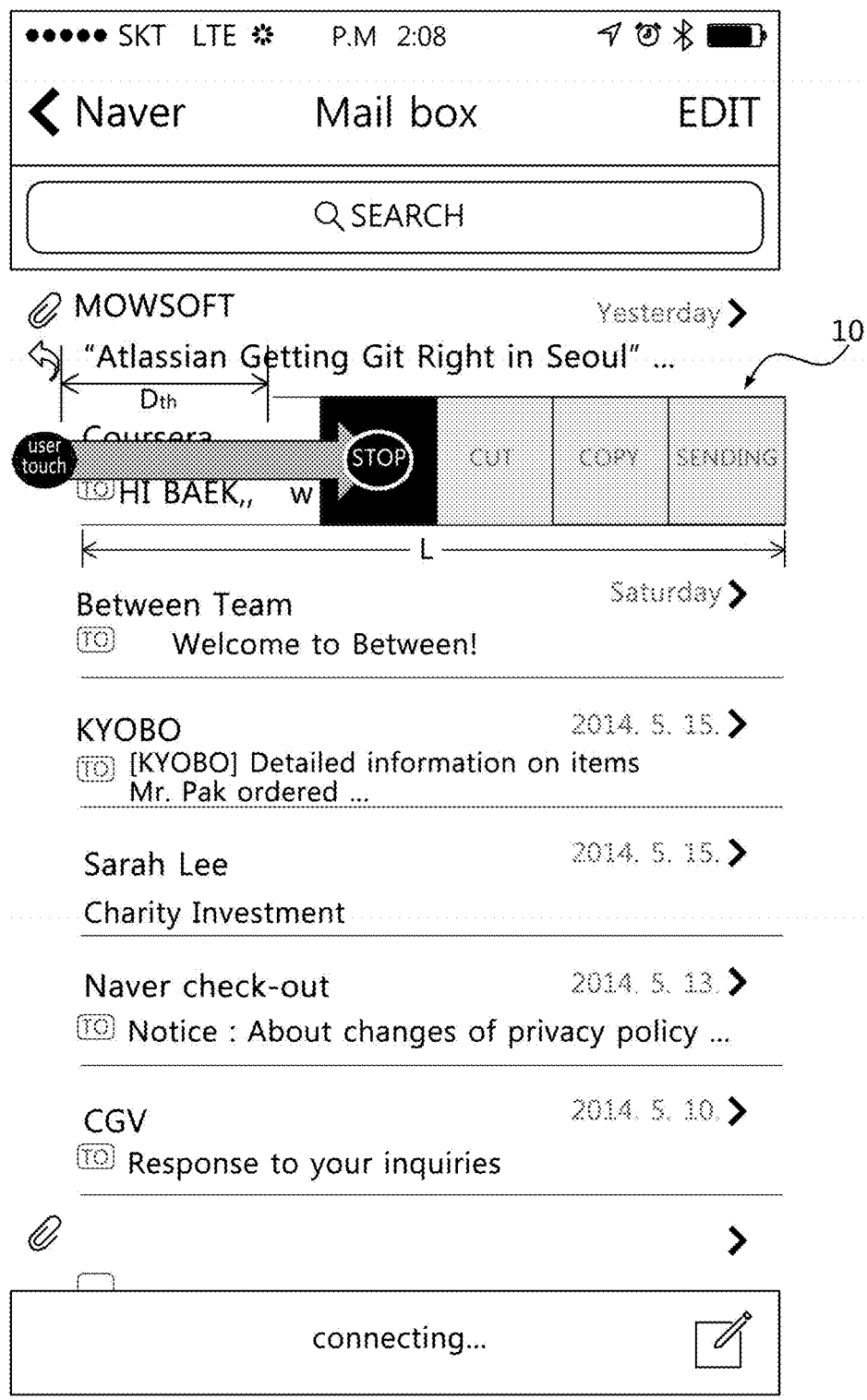
FIG. 4 is a screenshot illustrating a method of determining an execution instruction according to an exemplary embodiment.

FIG. 1 is a flow chart illustrating a file management method according to an exemplary embodiment. FIG. 2 is a flow chart illustrating a detailed process of S100 of FIG. 1. FIG. 3 is a screenshot of display when a file management menu cluster is displayed according to an exemplary embodiment. FIG. 4 is a screenshot illustrating a method of determining an execution instruction.

Referring to FIG. 1 to FIG. 4, a digital device may determine an execution instruction to be processed on one of the files, in response to a first input from a user in a first direction, which may be generated by touching one of files (S100). The digital device may display a file management menu cluster 10, which may include at least one file management menu, for the displayed file in response to the first input in the first direction (S110). More particularly, when a user touches a file by an input means, such as the user's finger or a stylus pen, and then slides the input means in the first direction, the digital device may detect the user's touch and slide and display the file management menu cluster 10 on the display apparatus. In other words, the digital device may detect whether the user's touch input on a file moves in the first direction, and display the file management menu cluster 10 if the movement is detected.

According to the present exemplary embodiment, the digital device may display the file management menu cluster 10, only if the first input moves more than a predetermined distance in the first direction. The distance of the first input movement may be measured from a start position of the first input to a stop position of the first input. For example, the predetermined distance may be 20% or 50% of displayed length of the file. As such, the digital device according to the present exemplary embodiment may prevent the file management menu cluster 10 from being unexpectedly displayed, when the user touches a file accidently.

The file management menu cluster 10 according to the present exemplary embodiment may include at least one of file management menus, such as deleting files, copying files, and sending files. The file management menu cluster 10 may include other file management menus that may be processed at once. Alternatively, the file management menu cluster 10 may be customized by user's choice. For example, a user may modify displayed position of each file management menu, add or remove some of file management menu according to frequency of use.

After the file management menu cluster 10 is displayed, the digital device may determine an execution instruction to be processed according to the first input (S120). The determination of the execution instruction may be performed by detecting a stopped position of the first input on the file management menu and determining an instruction that corresponds to the stopped position on the file management menu as an execution instruction to be processed. For example, as illustrated in FIG. 4, when a movement of the first input in the first direction stops at "DELETE" menu, the digital device may detect the stopped position and determine an instruction of delete of files, which corresponds to the stopped position, as an execution instruction. The digital device may display the "DELETE" menu differently from other non-selected menus. For example, the selected menu may be highlighted and the non-selected menu may be displayed dimly.

The file management menu cluster 10 may be displayed in a path of the first input in the first direction. When the file management menu cluster 10 is displayed in the path of the first input in the first direction, the step S110 and S120 may be performed without changing the first input movement direction.

Figure 5:
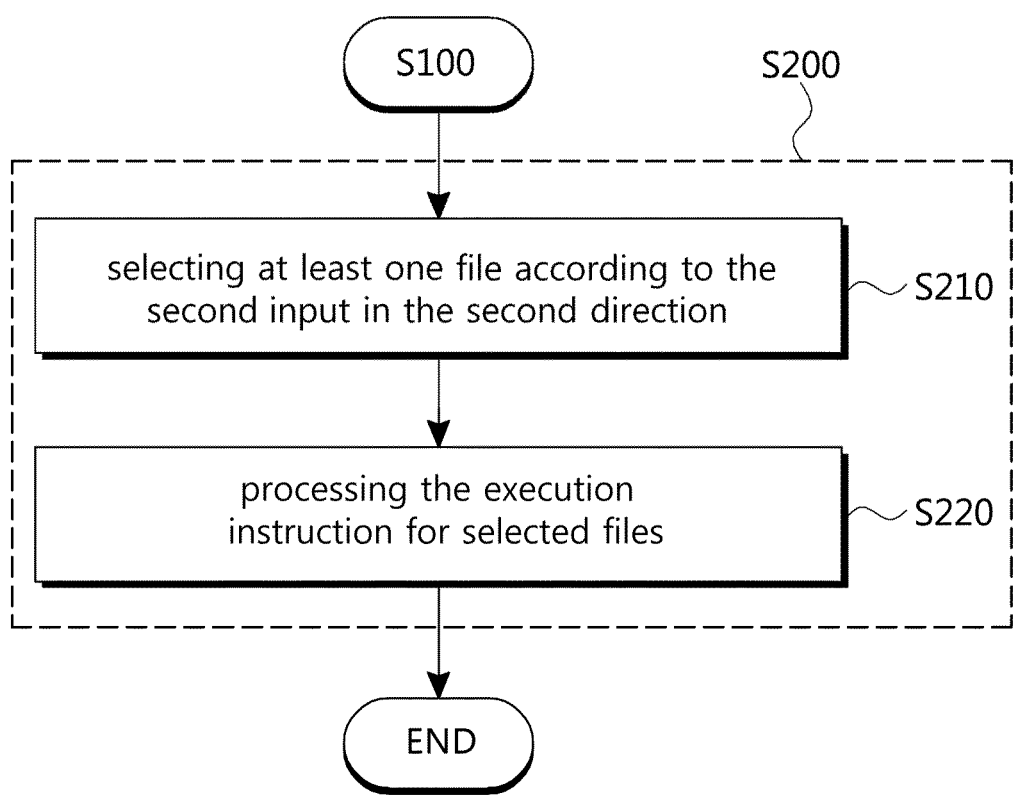
FIG. 5 is a flow chart for illustrating a detailed process of S200 of FIG. 1.
Figure 6:
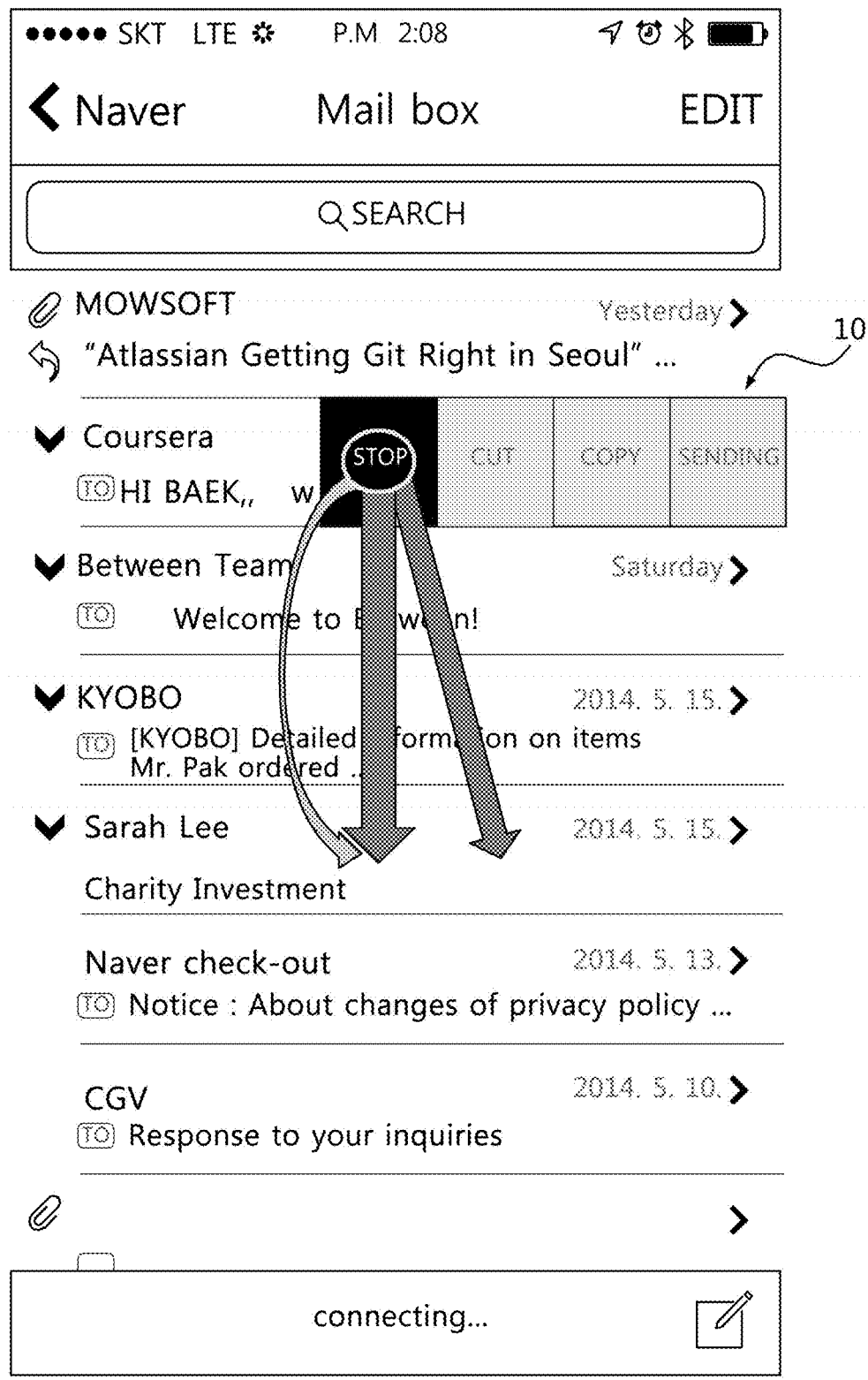
FIG. 6 illustrates a method of selecting files at S200.
Figure 7:
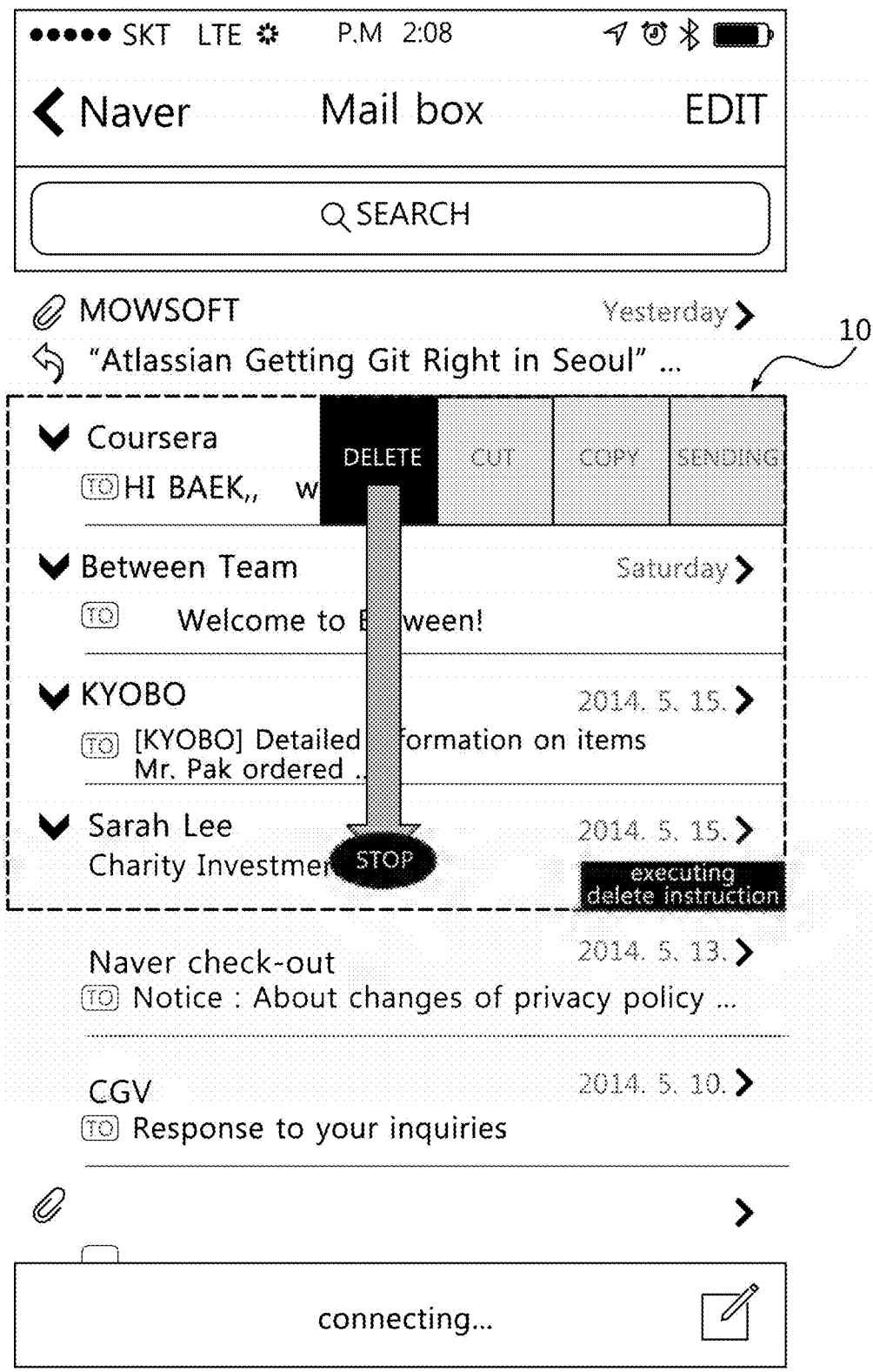
FIG. 7 illustrates a method of processing an execution instruction for selected files at S200 according to an exemplary embodiment.

FIG. 5 is a flow chart illustrating a detailed process of S200 of FIG. 1. FIG. 6 illustrates a method of selecting files at S200. FIG. 7 illustrates a method of processing an execution instruction for selected files at S200.

Referring to FIG. 1 and FIGS. 5 to 7, the digital device may process the execution instruction on at least two files including the first file, by a second input (S200). The second input may be a user's touch movement in a second direction intersecting the first direction. When the movement of the second input in the second direction is detected, the digital device may select at least one file arranged in the second direction according to the second input in the second direction (S210). For example, when a user touches the selected menu, for example "DELETE", with the user's finger, and then moves the finger on the display, the digital device may select at least one file on a path of the user's finger movement.

The second input may include a vector element in the second direction. For example, as illustrated in FIG. 6, at least one or more files may be selected not only by a straight touch movement, but also by a curved or diagonal touch movement, which include the vector element in the second direction.

After selecting at least one file (S210), the digital device may process the execution instruction, for example, the "DELETE" instruction, for the file selected at step S100 and at least one file selected at step S210 (S220).

The digital device may automatically process the execution instruction when the second input stops. More particularly, the digital device may process the execution instruction, e.g., "DELETE" instruction immediately when the touch input means, e.g., user's finger or stylus pen, departs from the display apparatus of the digital device.

Figure 8:
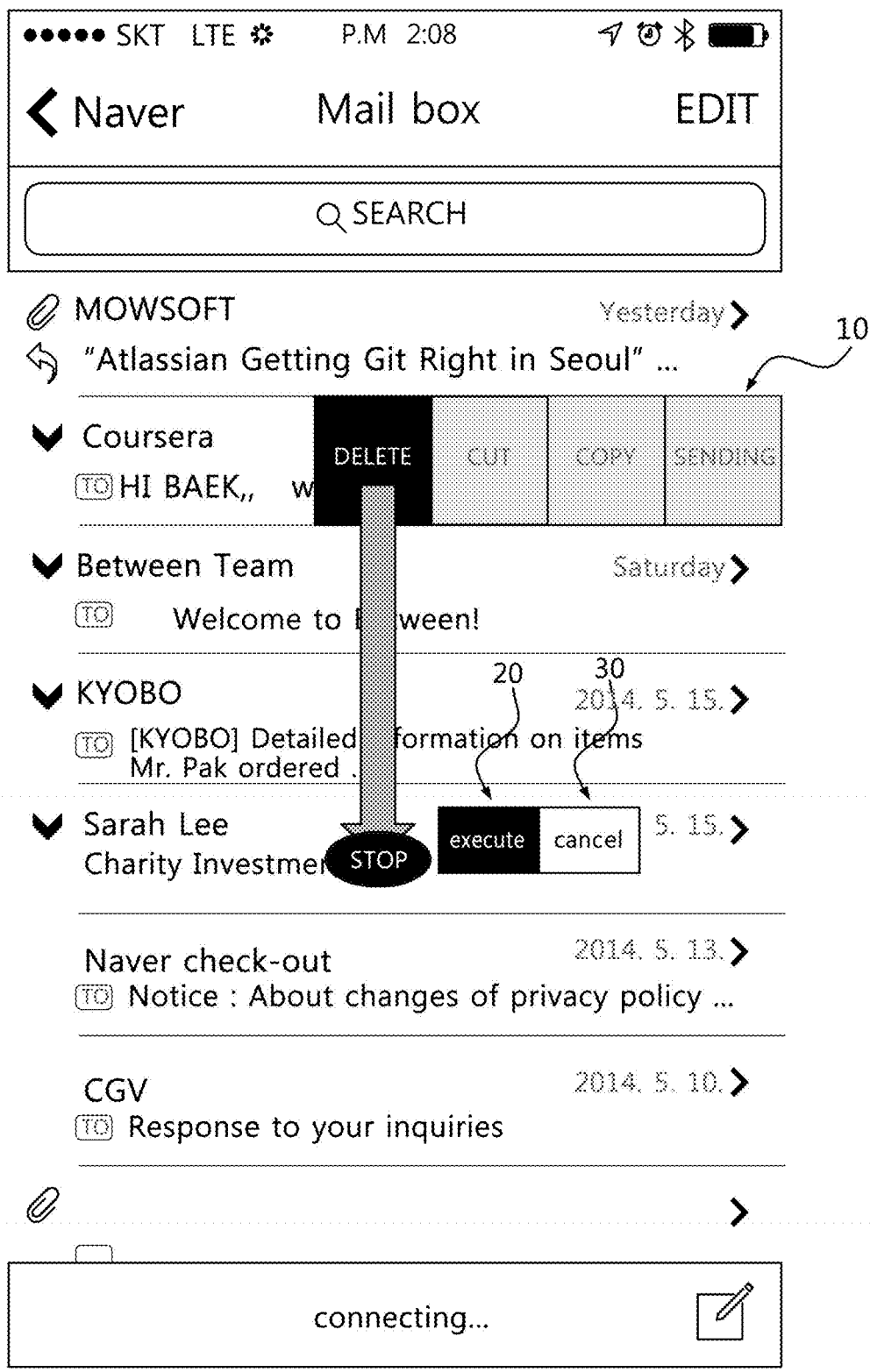
FIG. 8 illustrates a method of processing an execution instruction for selected files at S200 according to an exemplary embodiment.
Figure 9:
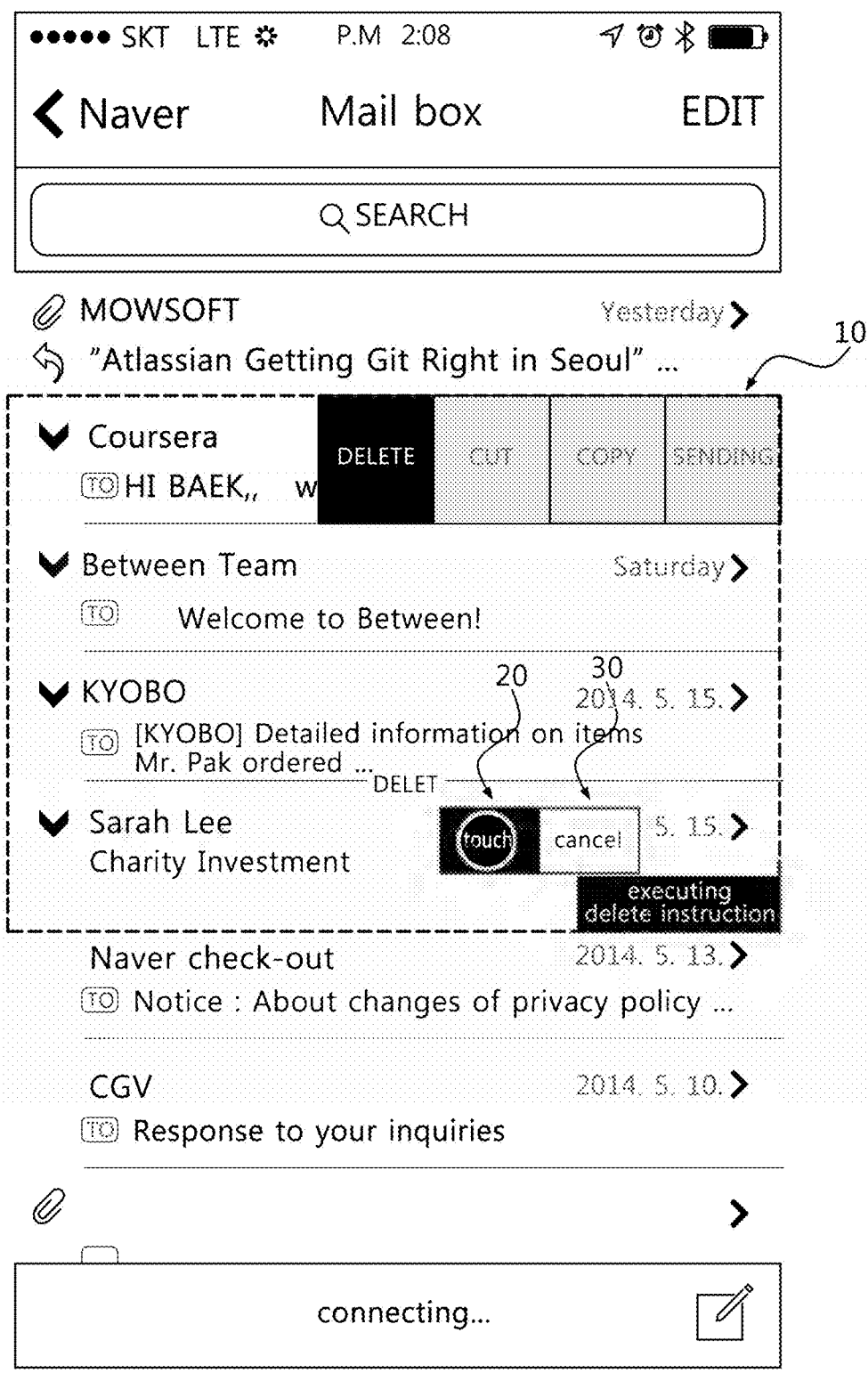
FIG. 9 illustrates a method of processing an execution instruction for selected files at S200 according to an exemplary embodiment.

FIG. 8 illustrates a process of executing an execution instruction for selected files at S200 according to an exemplary embodiment. FIG. 9 illustrates a process of executing an execution instruction for selected files at S200 according to an exemplary embodiment.

Referring to FIGS. 8 and 9, the execution instruction may not processed immediately when the second input stops. Referring to FIG. 8, when the second input stops, an execution menu 20 for actual process of the selected execution instruction may be provided. A separate user input (a third input) may be required to process the selected execution instruction, for example, "DELETE" instruction, for files selected in step S100 and S210.

According to the present exemplary embodiment, the digital device may provide a "cancel" menu for canceling process of the selected execution instruction along with the execution menu. When user touches the "cancel" menu, the digital device may cancel selection of files selected at S100 and S210.

As such, the digital devices according to the present exemplary embodiment may prevent executing a file management process, for example, deleting, copying, or sending, for files carelessly or erroneously selected, by providing the cancel menu with the execution menu.

Meanwhile, the first input in step S100 and the second input in step S200 may be performed continuously in a seamless way. For example, when a user touches a file with the user's finger and moves finger in a way of seamlessly drawing "ㄱ" shape, selection of execution instruction and selection of files to be processed may be performed sequentially, according to the user's finger touch movement. Alternatively, the first input in step S100 and the second input in step S200 may not be performed continuously, and may be performed with an interval therebetween.

According to the exemplary embodiments, since an execution instruction for process of file management is determined according to a first input in a first direction and files to be processed are selected according to a second input in a second direction, a user may execute a file management instruction for files simultaneously.

Figure 10:
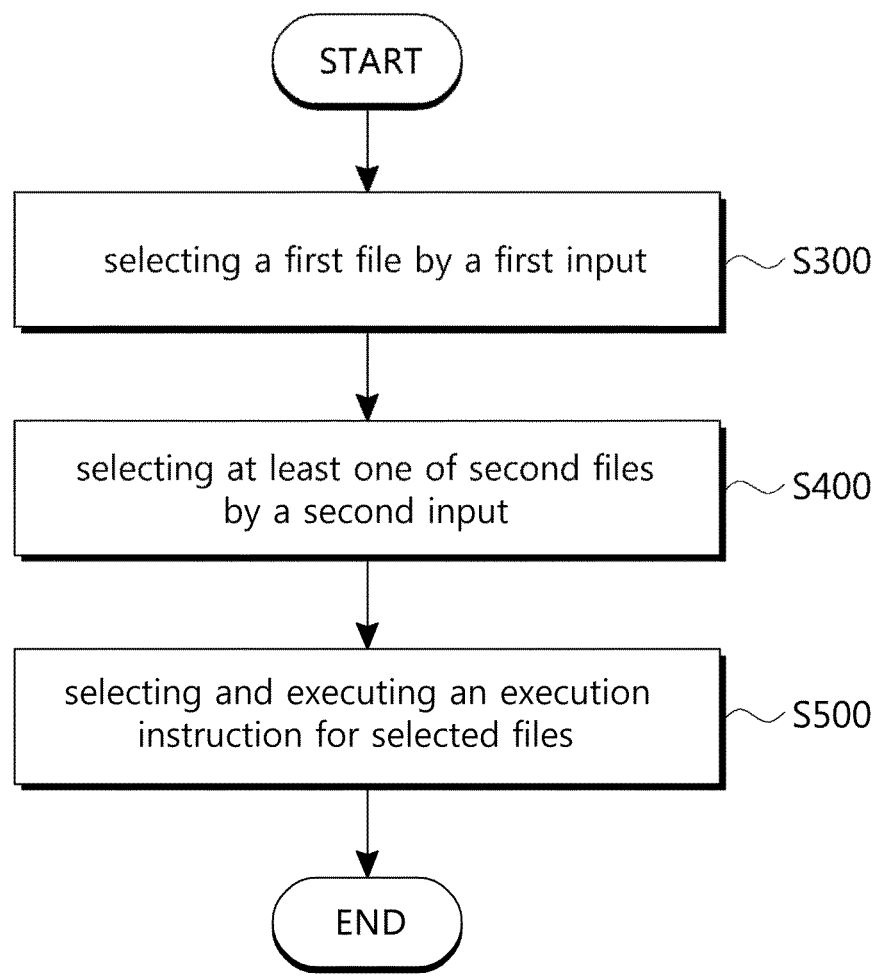
FIG. 10 is a flow chart illustrating a file management method according to an exemplary embodiment.
Figure 11:
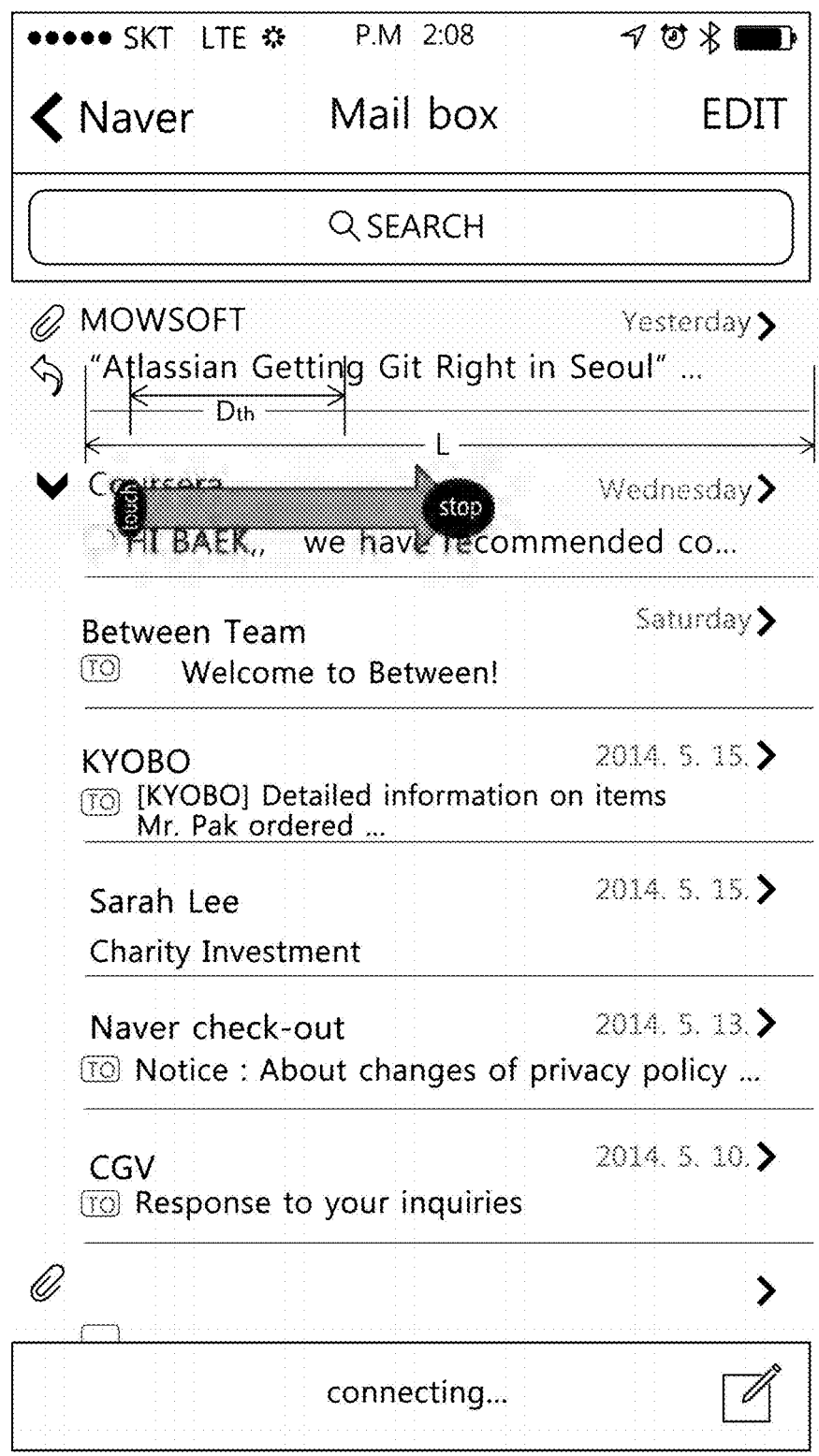
FIG. 11 illustrates a method of selecting a first file when the file management method of FIG. 10 is performed according to an exemplary embodiment.
Figure 12:
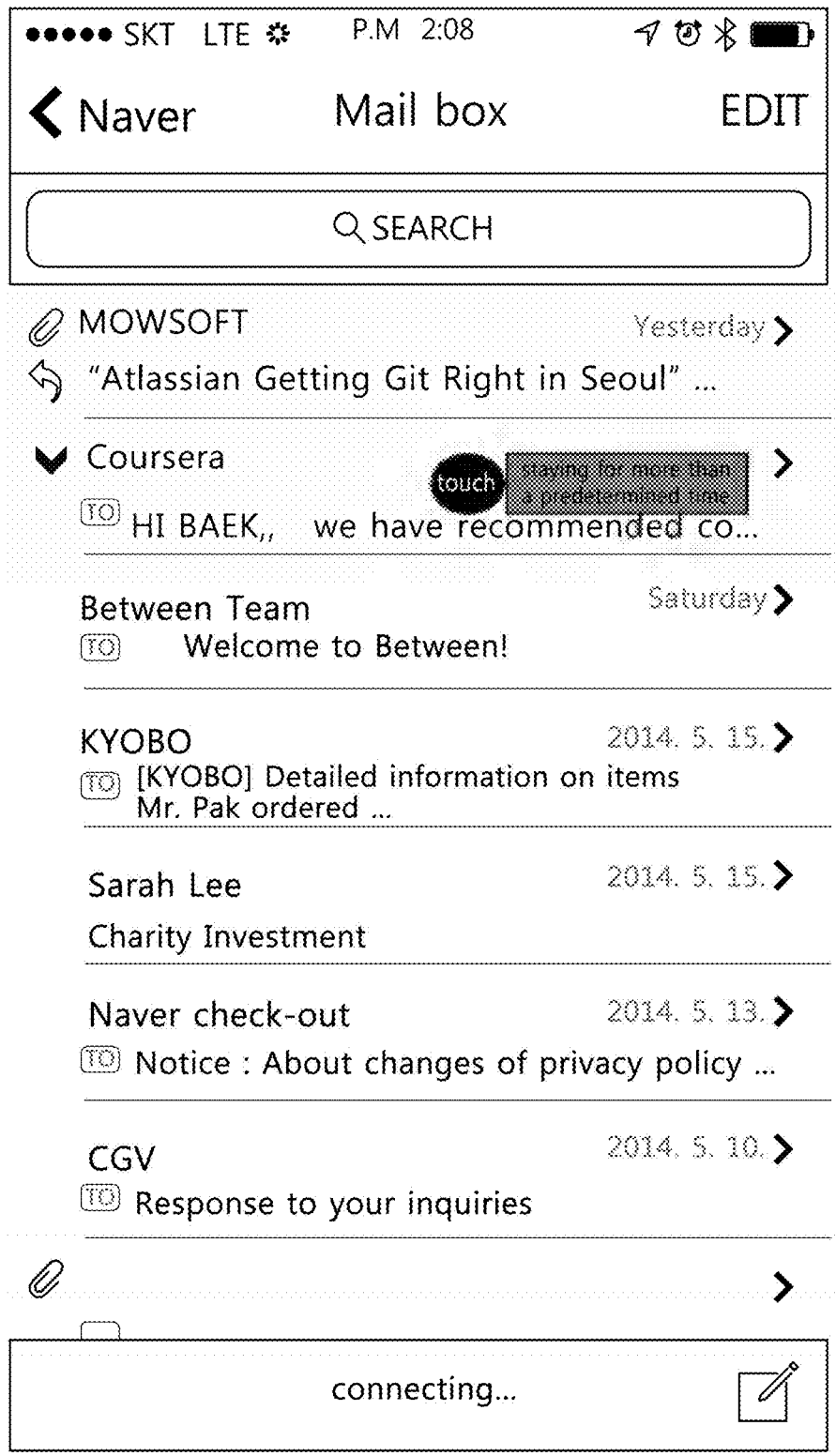
FIG. 12 illustrates a method of selecting a first file when the file management method of FIG. 10 is performed according to an exemplary embodiment.

FIG. 10 is a flow chart illustrating a file management method according to an exemplary embodiment. FIG. 11 illustrates a process of selecting a first file when the file management method of FIG. 10 is performed. FIG. 12 illustrates a process of selecting a first file when the file management method of FIG. 10 is performed.

According to the present exemplary embodiment, referring to FIG. 10, FIG. 11, and FIG. 12, the digital device may select a first file from the files according to a first input (S300). The digital device may determine that a file is selected, when the first input moves more than a predetermined distance in the first direction as illustrated by FIG. 11 (S300). The distance of the first input movement is measured from a start position of the first input to a stop position of the first input. For example, the predetermined distance $D_{th}$ may be 20% or 50% of displayed length L of the file.

According to an exemplary embodiment, as illustrated in FIG. 12, the digital device may determine that a file is selected, when the first input is maintained in a stopped position for a predetermined time (S300). The predetermined time, for example, may be 0.5 to 2 seconds.

According to the exemplary embodiments, the digital device may be prevented from unexpectedly selecting a file when a user simply touches a file accidently, as a file may be selected only when the first input moves more than a predetermined distance or when the first input is maintained in the file for a predetermined time.

Figure 13:
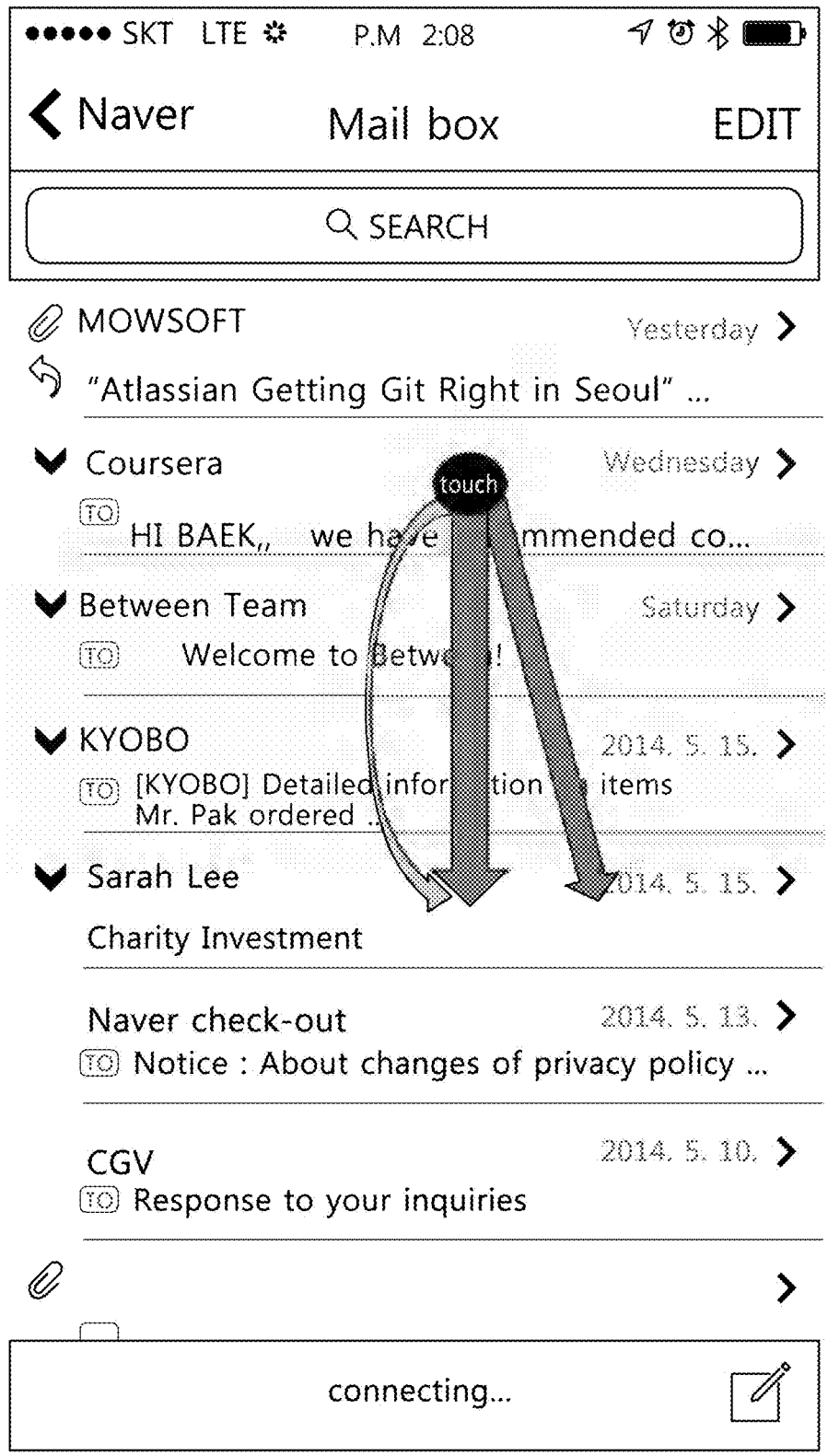
FIG. 13 is a screenshot illustrating a method of selecting files when the file management method of FIG. 10 is performed according to an exemplary embodiment.

FIG. 13 is a screenshot illustrating a method of selecting files when the file management method of FIG. 10 is performed.

Referring to FIGS. 10 and 13, when the digital device detects movement of the second input in the second direction from the selected file, the digital device may select at least one file according to the second input in the second direction (S400). For example, when a user touches a file or a message with the user's finger and moves the finger on the display, the digital device may select at least one file on a path of the user's finger movement. Herein, the second direction may be a direction orthogonal to the first direction.

The second input may include a vector element in the second direction. For example, as illustrated in FIG. 13, at least one file may be selected by a straight touch movement, or by a curved or diagonal touch movement, which include the vector element in the second direction.

Meanwhile, the first input in step S300 and the second input in step S400 may be performed continuously in a seamless way. For example, when the user touches a file with the user's finger and moves the finger in a way of seamlessly drawing "ㄱ" shape, selection of execution instruction and selection of files to be processed may be performed sequentially, according to the user's finger touch movement. Alternatively, the first input in step S300 and the second input in step S400 may not be performed continuously, and may be performed with an interval therebetween.

Figure 14:
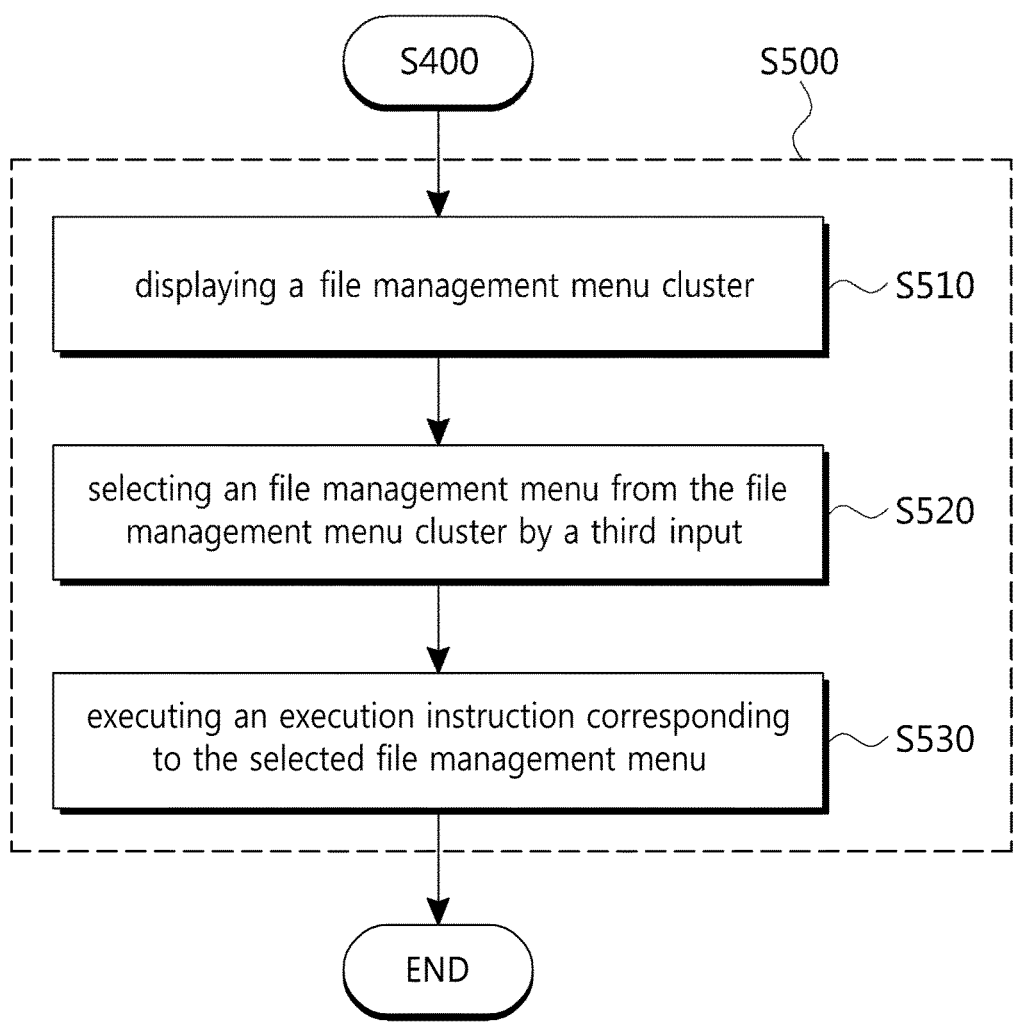
FIG. 14 is a flow chart illustrating detailed process of S500 of FIG. 10.
Figure 15:
FIG. 15 is a screenshot illustrating a method of displaying a file management menu cluster according to an exemplary embodiment.
Figure 16:
FIG. 16 is a screenshot illustrating a method of selecting and executing an execution instruction of FIG. 14 according to an exemplary embodiment.

FIG. 14 is a flow chart illustrating a detailed process of S500 of FIG. 10. FIG. 15 is a screenshot illustrating a step of displaying a file management menu cluster. FIG. 16 is a screenshot of selecting and executing an execution instruction of FIG. 14.

Referring to FIG. 10, FIG. 14, FIG. 15 and FIG. 16, the digital device may select and execute an execution instruction for managing the first file and the at least one of second files selected by the second input.

More specifically, the step of selecting and executing an execution instruction may include displaying a file management menu cluster 40 including at least one file management menu (S510). The file management menu cluster 40 may be displayed when the second input stops.

According to an exemplary embodiment, the file management menu cluster 40 may include file management menus including at least one of deleting files, copying files, and sending files. Alternatively, the file management may include further menus for other file management instructions to be processed. The file management menu cluster 40 may be customized by a user's choice. For example, the user may modify displayed position of each file management menu, add or remove some of file management menu according to frequency of use.

The determination of execution instruction may be performed by detecting a user input (a third input) and determining an instruction, which corresponds to a file management menu the user touches, as an execution instruction to be processed (S520). For example, as illustrated in FIG. 16, when the user touches "DELETE" menu, the device may detect the user's touch and determine an instruction for delete of files as an execution instruction. The digital device may display a selected menu differently from a non-selected menu. For example, a selected menu may be highlighted and non-selected menu may be displayed dimly.

Consecutively, the digital device may process the selected instruction as an execution instruction (S530). For example, digital device may process "DELETE" instruction as an execution instruction for the selected files immediately.

Figure 17:
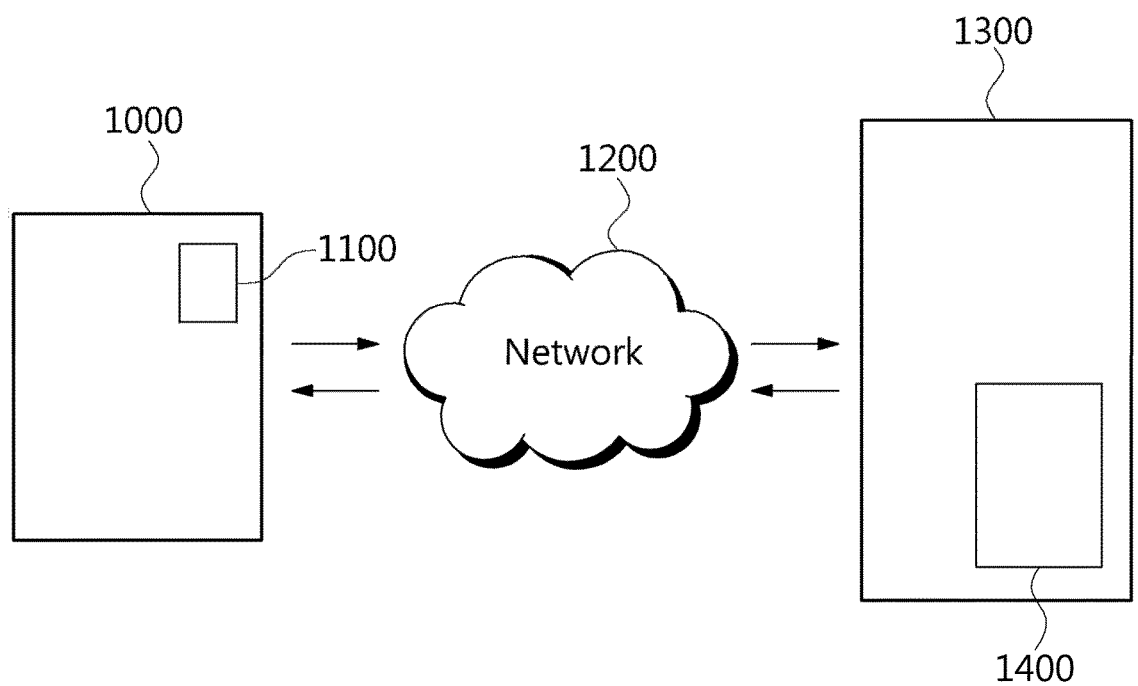
FIG. 17 is a schematic diagram of a system performing a file management method according to an exemplary embodiment.
Figure 18:
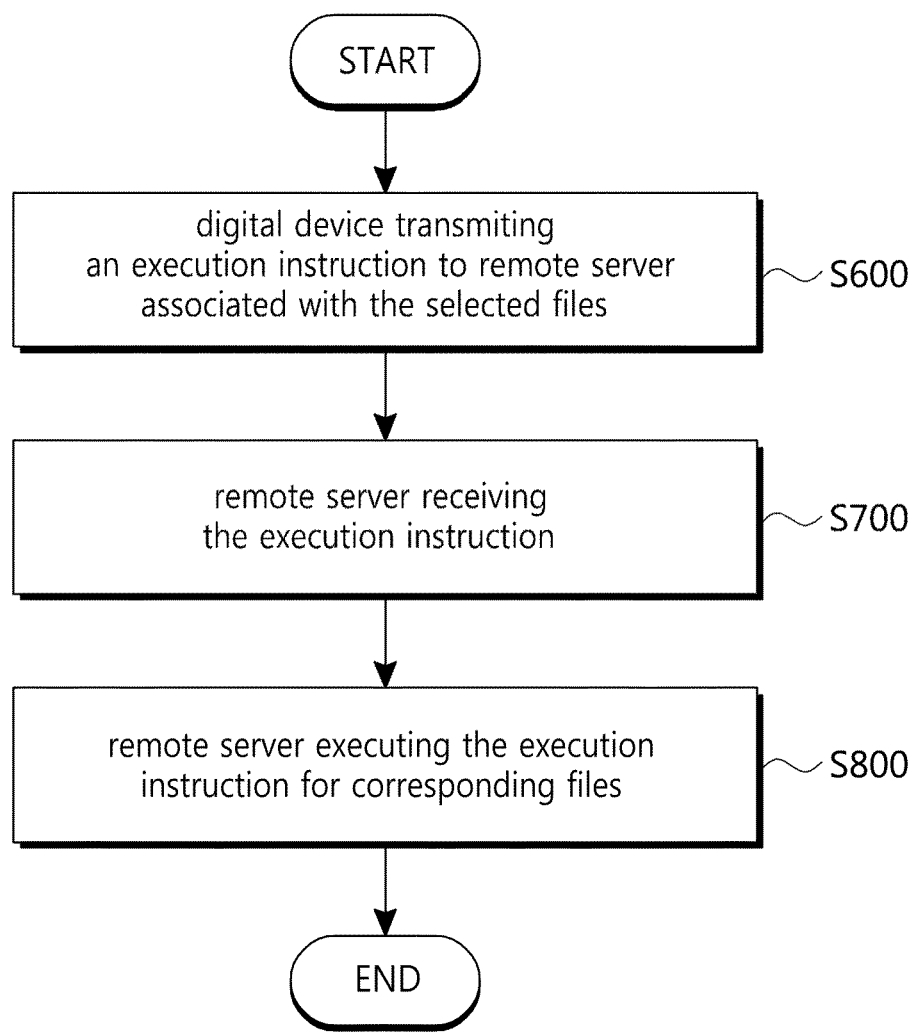
FIG. 18 is a flow chart illustrating a method of communicating and executing an execution instruction between a digital device and a remote server according to an exemplary embodiment.

FIG. 17 is a schematic diagram of a system performing a file management method according to an exemplary embodiment. FIG. 18 is a flow chart illustrating a method of communicating and executing an execution instruction between a digital device and a remote server according to an exemplary embodiment.

Referring to FIG. 17, a system performing a file management method according to an exemplary embodiment may include a digital device 1000 including a processor 1100, which may perform the file management method. The file management method according to the present exemplary embodiment may be substantially similar to the file management method illustrated with reference to FIGS. 1 to 16, and thus, duplicative description thereof will be omitted. The digital device 1000 may include a touch interface display apparatus, through which a user may provide an input with the user's finger or a stylus.

When the digital device 1000 executes the execution instruction for selected files by the processor 1100, the digital device 1000 may transmit the execution instruction to at least one remote server 1300 associated with the selected files via a communication network 1200. The remote server 1300 may be, for example, a mailing server, a messenger server, and a social network service (SNS) server. In response to receiving the execution instruction from the digital device 1000, the remote server 1300 may process the execution instruction for corresponding files stored in a database 1400 thereof.

Referring to FIG. 18, a digital device according to an exemplary embodiment may transmit an execution instruction to a remote server associated with a first file selected by a first input and a second file selected by a second input via a communication network (S600). The remote server may be, for example, a mailing server, a messenger server, and a social network service (SNS) server, etc., each including a database storing files, which may be displayed on the display device. The remote server may receive the execution instruction from the digital device via the communication network (S700). In response, the remote server may execute the received execution instruction for corresponding files (S800).

According to the exemplary embodiments, as a file is selected according to a first input and an execution instruction and selection of files to be processed is determined according to a second input in a second direction, a user may execute a file management instruction for files simultaneously more easily, by way of seamlessly drawing "ㄱ" shape with the user's finger.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A method performed by a digital device comprising a touch interface display apparatus to simultaneously process files displayed thereon, the method comprising:
    detecting selections of a first file of the files and a command to be executed on the first file from a first input, by a processor of the digital device, the first input comprising a user's touch movement in a first direction on the first file up to where a first image corresponding to the command is displayed;
    executing the command for the first file and at least a second file of the files from a second input, by the processor of the digital device, the second input comprising the user's touch movement substantially in a second direction intersecting the first direction from the first image to the second file;
    transmitting the command over a communication network to one or more remote servers associated with the first and second files; and
    executing the received command, by each of the remote servers, for corresponding ones of the first and second files stored on a database of the remote server,
    wherein the files displayed on the digital device are arranged in the second direction.

2. The method of claim 1, wherein the step of detecting selections of the first file and the command comprises:
    displaying a file management menu cluster on the first file in response to the first input, the file management menu cluster comprising the first image corresponding to the command to be executed; and
    selecting the command represented by the first image from the file management menu cluster according to the first input.

3. The method of claim 2, wherein the file management menu cluster is displayed when a distance between a start point and an end point of the first input in the first direction is greater than a threshold distance.

4. The method of claim 3, wherein the file management menu cluster is displayed along a path of the first input in the first direction.

5. The method of claim 2, wherein the file management menu cluster comprises at least one of deleting files, copying files, and sending files.

6. The method of claim 2, wherein the first image that corresponds to an end point of the first input is determined as the command.

7. The method of claim 6, wherein the second input starts from the end point of the first input.

8. The method of claim 1, wherein the step of executing the command by the processor of the digital device comprises:
    selecting the second file by the second input; and
    processing the command to both of the first and second files.

9. The method of claim 8, wherein the second input comprises a vector element in the second direction.

10. The method of claim 8, wherein the command is executed by the processor of the digital device automatically when the second input stops.

11. The method of claim 8, wherein the step of processing the command by the processor of the digital device comprises:
    displaying an execution menu for executing the command; and
    processing the command for the first file and the second file, in response to a third input comprising a touch on the execution menu.

12. The method of claim 11, wherein the execution menu comprises a cancel menu for canceling processing of the command.

13. The method of claim 1, wherein the first input and the second input are performed continuously.

14. The method of claim 1, wherein the files comprise at least one from a mailing account, a messenger service account, and a social network service (SNS) account.

15. A method performed by a digital device comprising a touch interface display apparatus to simultaneously process files displayed thereon, the method comprising:
    selecting a first file from the files according to a first input, the first file displayed along a first direction with respect to the digital device and the files being arranged in a second direction intersecting the first direction;
    selecting a command to be executed on the first file from the first input, the first input comprising a user's touch movement on the first file in the first direction up to where a first image corresponding to the command is displayed;
    selecting at least one second file from the files after selecting the command for the first file according to a second input, the second input comprising the user's touch movement substantially in the second direction from the first image to the second file; and
    executing the command for the first file and the selected at least one second file.

16. The method of claim 15, wherein the first file is selected when the first input stays on the first file longer than a threshold period.

17. The method of claim 15, wherein the second input comprises a vector element in the second direction.

18. The method of claim 15, wherein the first input and the second input are performed continuously.

19. The method of claim 15, wherein the step of executing the command comprises:
    displaying a file management menu cluster comprising the first image corresponding to the command;
    selecting the command represented by the first image by a third input; and
    executing the command to the first file and the selected at least one second file.

20. The method of claim 19, wherein the file management menu cluster comprises at least one of deleting files, copying files, and sending files.

21. The method of claim 19, wherein the file management menu cluster further comprises a cancel menu for canceling a selection of the at least one second file by the second input.

22. The method of claim 15, wherein the files comprise at least one file of a mailing account, a messenger service account, and a social network service (SNS) account.

* * * * *